US012809829B2

(12) United States Patent
Pore et al.

(10) Patent No.: US 12,809,829 B2
(45) Date of Patent: Nov. 24, 2026

(54) METADATA EXTRACTION AND SCHEMA EVOLUTION TRACKING FOR DISTRIBUTED NoSQL DATA STORES

(71) Applicant: AMERICAN EXPRESS TRAVEL RELATED SERVICES COMPANY, INC., New York, NY (US)

(72) Inventors: Akshay Pore, Phoenix, AZ (US); Man Chon U, Sunrise, FL (US); Sebastian Vasquez, Phoenix, AZ (US); Ratnesh Kumar Mishra, Phoenix, AZ (US); Mohnish Gorantla, Phoenix, AZ (US); Hari Madineni, New York, NY (US)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

(21) Appl. No.: 18/240,501

(22) Filed: Aug. 31, 2023

(65) Prior Publication Data

US 2025/0077481 A1 Mar. 6, 2025

(51) Int. Cl.
*G06F 16/21* (2019.01)
*G06F 16/22* (2019.01)

(52) U.S. Cl.
CPC ........ *G06F 16/213* (2019.01); *G06F 16/2255* (2019.01)

(58) Field of Classification Search
CPC ........................... G06F 16/2255; G06F 16/213
See application file for complete search history.

(56) References Cited

U.S. PATENT DOCUMENTS

| | | | | |
|---|---|---|---|---|
| 7,343,377 B1 * | 3/2008 | van Opdorp | G06F 16/2365 707/999.102 |
| 11,049,596 B2 * | 6/2021 | Virkar | G16H 10/20 |
| 2008/0140947 A1 * | 6/2008 | Slik | G06F 3/0644 711/E12.002 |
| 2011/0145210 A1 * | 6/2011 | Rathinam | G06F 16/907 707/812 |
| 2013/0097103 A1 * | 4/2013 | Chari | G06N 20/10 707/E17.089 |
| 2016/0034372 A1 * | 2/2016 | Panda | G06F 11/263 714/33 |

(Continued)

*Primary Examiner* — Sherief Badawi
*Assistant Examiner* — Earl Levi Elias
(74) *Attorney, Agent, or Firm* — Sterne, Kessler, Goldstein & Fox P.L.L.C.

(57) ABSTRACT

Disclosed herein are system, method, and computer program product embodiments for extracting and tracking metadata from a data store. For example, the method includes extracting a plurality of identifiers of data from a data source. An identifier uniquely identifies a record in the data source. The method further includes scanning the data to extract a plurality of data samples, extracting metadata from each data sample of the plurality of data samples, hashing the metadata of each respective data sample to generate a respective hash value associated with each respective data sample of the plurality of data samples, comparing the hash values to identify one or more unique hash values, identifying one or more unique schemas corresponding to the unique hash value, and storing the one or more unique schemas in a data store. The metadata comprises schema indicative of one or more attributes of each respective data sample.

20 Claims, 16 Drawing Sheets

(56) References Cited

U.S. PATENT DOCUMENTS

| | | | | |
|---|---|---|---|---|
| 2019/0044727 | A1* | 2/2019 | Scott | G06F 21/645 |
| 2021/0150056 | A1* | 5/2021 | Vax | G06F 16/285 |
| 2021/0390204 | A1* | 12/2021 | Jagtap | G06F 16/211 |

* cited by examiner

200

Airline 1

```
{
    “callsign”:”USKY”,
    “country”:”United States”,
    “iata”: “E1”,
    “icao”:”ES2",
    “id”: 16702,
    “name”: “Usa Sky Cargo”,
    “type”: “airline”
}
```

FIG. 2A

202

Airline 2

```
{
    “callsign”:”USK”,
    “country”:”United States”,
    “id”: 16703,
    “name”: “Usa Kentuky”,
    “type”: “airline”
}
```

FIG. 2B

204

Airline 3

```
{
    “callsign”:”UST”,
    “country”:”United States”,
    “iata”: “E1”,
    “icao”:”ES2",
    “id”: 16704,
    “name”: “Usa Transport”,
    “type”: “airline”,
    “schedule”: [{
          “day”: 0,
          “flight”: “BA270”,
          “utc”: “00:20:00”
    }],
    “route”: [{
          “destinationairport”: “LHR”,
          “distance”: 6976.476253448951,
          “equipment”: “767”
          “sourceairport”: “NAS”,
          “stops”: 0
    }]
    }
```

FIG. 2C

414 a1012
a1029
a3911
a3878
a4671
a5001
a7104
a7498

FIG. 4B 420a
420b

{"fruit": "Apple", "size": "Large", "color": "Red"}
{"fruit": "Apple", "size": "Small", "color": "Red"}
{"fruit": "Apple", "size": "Small", "color": "Red"}
{"fruit": "Apple", "size": "Large", "color": "Red", "farm": "California"}
{"fruit": "Lemon", "size": "Medium", "color": "Yellow"}
{"fruit": "Lemon", "size": "Medium", "color": "Yellow"}
{"fruit": "Apple", "size": "Large", "color": "Red"}
{"fruit": "Lemon", "size": "Small", "color": "Yellow", "farm": "Mexico"}

FIG. 4C 418a
418b

{"fruit": "", "size": "", "color": ""}
{"fruit": "", "size": "", "color": ""}
{"fruit": "", "size": "", "color": ""}
{"fruit": "", "size": "", "color": "", "farm":""}
{"fruit": "", "size": "", "color": ""}
{"fruit": "", "size": "", "color": ""}
{"fruit": "", "size": "", "color": ""}
{"fruit": "", "size": "", "color": "", "farm":""}

FIG. 4D

FIG. 7
700
Scan
Iteration 1
1 to 200 Set
1 to 50
201 to 400 Set
201 to 250
401 to 600 Set
401 to 450
601 to 800 Set
601 to 650
801 to 1000 Set
801 to 850
Iteration 2
1 to 200 Set
51 to 100
201 to 400 Set
251 to 300
401 to 600 Set
451 to 500
601 to 800 Set
651 to 700
801 to 1000 Set
851 to 900
Iteration 3
1 to 200 Set
101 to 150
201 to 400 Set
301 to 350
401 to 600 Set
601 to 650
601 to 800 Set
701 to 750
801 to 1000 Set
901 to 950
Iteration 4
1 to 200 Set
151 to 200
201 to 400 Set
351 to 400
401 to 600 Set
651 to 700
601 to 800 Set
751 to 800
801 to 1000 Set
951 to 1000

METADATA EXTRACTION AND SCHEMA EVOLUTION TRACKING FOR DISTRIBUTED NoSQL DATA STORES

TECHNICAL FIELD

Aspects relate to systems and methods for metadata extraction and schema evolution tracking.

BACKGROUND

Relational databases are used for storing and retrieving a variety of information. However, with advancements in big data and cloud computing, data volumes have become huge and data structures have become complex, with less rigid and constantly changing structures. In such scenarios, traditional relational databases are not the only solution for storing and retrieving information. This has led to the emergence of not only structured query language (NoSQL) data stores. A NoSQL data store provides a mechanism for storage and retrieval of data that is modeled differently than tabular relations used in the relational databases. The tabular relations in the relational databases have a formatted data structure with the same field composition for each record. However, the structure may not be fixed in NoSQL stores as they are categorized into multiple types based on their underlying data models, such as key-value, document type, column oriented, and graph. Based on these categories, different records can have different fields. In a relational database, the schemas of records of each object type are the same. However, in a non-relational data store (e.g., NoSQL), schemas of different records of the same object type may be different. This adds complexity and complicates efficient data storage.

SUMMARY

Aspects of this disclosure are directed to systems and methods for extracting and tracking metadata from a data source. For example, the method includes extracting a plurality of identifiers of data from a data source. An identifier uniquely identifies a record in the data source. The method further includes scanning the data to extract a plurality of data samples, extracting metadata from each data sample of the plurality of data samples, hashing the metadata of each respective data sample to generate a respective hash value associated with each respective data sample of the plurality of data samples, comparing the hash values to identify one or more unique hash values, identifying one or more unique schema corresponding to the unique hash values, and storing the one or more unique schema in a data store. The metadata comprises schema indicative of one or more attributes of each respective data sample.

Certain aspects of the disclosure have other steps or elements in addition to or in place of those mentioned above. The steps or elements will become apparent to those skilled in the art from a reading of the following detailed description when taken with reference to the accompanying drawings.

BRIEF DESCRIPTION OF THE DRAWINGS

The accompanying drawings, which are incorporated herein and form a part of the specification, illustrate aspects of the present disclosure and, together with the description, further serve to explain the principles of the disclosure and to enable a person skilled in the art to make and use the aspects.

FIG. 2A is a schematic that illustrates a first flexible schema, in accordance with an embodiment of the present disclosure.

FIG. 2B is a schematic that illustrates a second flexible schema, in accordance with an embodiment of the present disclosure.

FIG. 2C is a schematic that illustrates a third flexible schema, in accordance with an embodiment of the present disclosure.

FIG. 4B is a diagram that illustrates a plurality of identifiers of a data source, in accordance with an embodiment of the present disclosure.

FIG. 4C is a diagram that illustrates a plurality of data samples, in accordance with an embodiment of the present disclosure.

FIG. 4D is a diagram that illustrates a plurality of metadata extracted from a plurality of data samples, in accordance with an embodiment of the present disclosure.

In the drawings, like reference numbers generally indicate identical or similar elements. Additionally, generally, the left-most digit(s) of a reference number identifies the drawing in which the reference number first appears.

DETAILED DESCRIPTION

Aspects of the present disclosure relate to a system for metadata extraction and schema evolution tracking for distributed Not-only Structured Query Language (NoSQL) data stores. In particular, the present disclosure relates to extracting metadata from a plurality of records or documents (also referred to herein as data samples), and identifying and tracking unique schema associated with the plurality of records or documents.

Because NoSQL data stores can have flexible schema, disparate techniques to extract metadata and schemas have been used based on the NoSQL data store in order to enforce data standards and utilize the stored data. Conventional methods to extract schema suffer from a plurality of problems. First, metadata may be extracted from certain NoSQL data stores (e.g., MongoDB, Couchbase) only with an index. However, some NoSQL data stores do not use a primary index or a secondary index. Thus, the methods requiring an index do not fully address the flexible schema used in NoSQL.

Other NoSQL data stores support a primary index but limit its use to non-production use cases, making this solution un-scalable. For example, some NoSQL data stores (e.g., Couchbase) use primary indexes during development phases. The primary indexes, however, are not recommended for use in real-world production use cases. In addition, current approaches do not have the ability to track schema versions and are not applicable to all NoSQL data store types (e.g., key-value, document type, column-oriented, and graph).

What is needed are systems and methods to address the aforementioned problems, and to provide improved techniques for metadata extraction and schema tracking.

Disclosed herein is a system that can scan, extract, identify, and classify different flavors of metadata and schema present in a NoSQL data store and track changes made to the schema over a period of time. The techniques described herein may be deployed to any NoSQL data store as well as any other type of data store (outside of NoSQL) employing a key-value structure. As used herein, a schema may be indicative of the structure of the data in the data store. For example, a schema may refer to the particular set of fields for a given data record. The data or information stored in the data store may have varying sets of fields with different data types for each field. Example data records with different schema are further described with reference to FIGS. 2A-2C.

System Overview and Function

Figure 1:
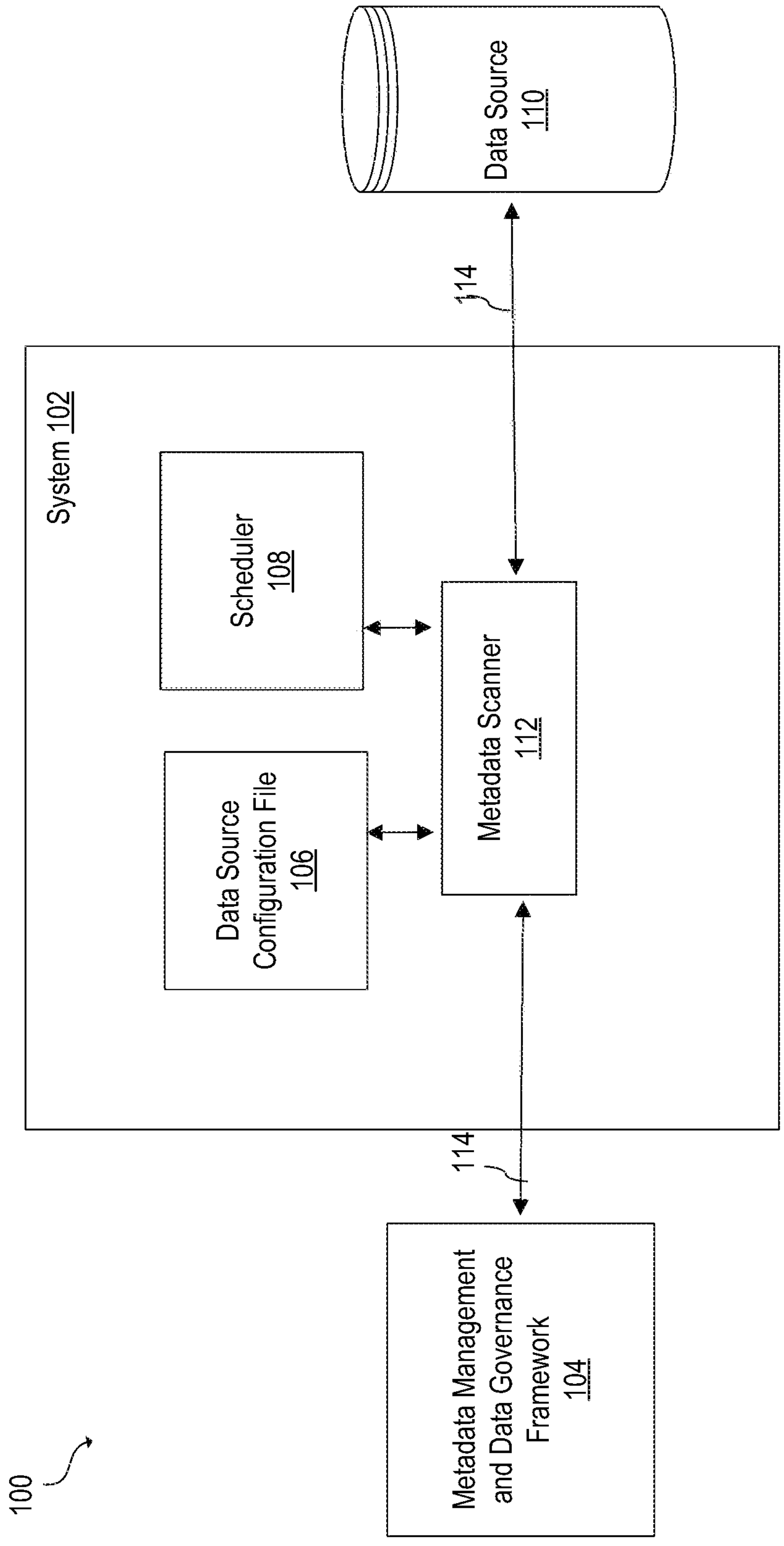
FIG. 1 is a block diagram of an environment for a system that provides metadata extraction and schema evolution tracking, in accordance with an embodiment of the present disclosure.

FIG. 1 is a block diagram of an environment 100 for a system 102 that provides metadata extraction and schema evolution tracking, in accordance with an embodiment of the present disclosure. Environment 100 may include system 102 that interfaces with a metadata management and data governance framework 104 and a data source 110.

System 102 may include a data source configuration file 106, a scheduler 108, and a metadata scanner 112. System 102 and metadata scanner 112 may operate on one or more servers and/or data stores. In some embodiments, system 102 may be implemented using computer system 1200 as described further with reference to FIG. 12. System 102 may provide a cluster computing platform or a cloud computing platform to scan data from data source 110 and provide the extracted metadata to metadata management and data governance framework 104. For example, system 102 may access data source 110 based on a trigger from scheduler 108 and may scan data source 110 based on one or more parameters stored in data source configuration file 106. System 102 may access data source 110 via a network 114.

Data source 110 may comprise data from a plurality of sources. The data may be stored without modification to their associated data structure. In some aspects, data source 110 may comprise a data store. The data store may be a NoSQL data store having a flexible schema. In some embodiments, a NoSQL data store may refer to any data store that employs a key-value structure at its core for data storage and retrieval. Types of NoSQL data stores may include: key value, document, graph, and columnar. The key value data store may store unique keys with pointers to one or many values. In a document data store, a key points to a value stored in a complex structure such as extensible markup language (XML) or JavaScript Object Notation (JSON). The document data store includes a set of attributes that can be included or excluded. The document data store can be flexible depending on a system or application using it. An exemplary document data store is further described in relation to FIG. 2.

As described above, in addition to the document data store and the key value data store, NoSQL data stores may include a graph data store and a columnar data store which also employ key-value structures at their core. In the graph data store, graphs including nodes, edges, and properties are used to represent and store data. A key value may map as an adjacency list. The adjacency list may represent a graph as an array of linked lists. The columnar data store may store data in columns instead of rows. The columns may be gathered to form sub-groups. The columnar data store may be implemented as a key-value multidimensional nested sorted map of maps. The data is stored in cells of columns and grouped into column families.

System 102 may access data source 110 (e.g., a target data store) via network 114. Network 114 refers to a telecommunications network, such as a wired or wireless network. Network 114 can span and represent a variety of networks and network topologies. For example, network 114 can include wireless communication, wired communication, optical communication, ultrasonic communication, or a combination thereof. For example, satellite communication, cellular communication, Bluetooth, Infrared Data Association standard (IrDA), wireless fidelity (WiFi), and worldwide interoperability for microwave access (WiMAX) are examples of wireless communication that may be included in network 114. Cable, Ethernet, digital subscriber line (DSL), fiber optic lines, fiber to the home (FTTH), and plain old telephone service (POTS) are examples of wired communication that may be included in the network 114. Further, network 114 can traverse a number of topologies and distances. For example, network 114 can include a direct connection, personal area network (PAN), local area network (LAN), metropolitan area network (MAN), wide area network (WAN), or a combination thereof.

As described previously herein, metadata scanner 112 may scan data source 110 based on configuration parameters stored in data source configuration file 106. The configuration parameters may comprise a sampling percentage and a number of datasets. A user may provide the configuration parameters or settings using a graphical user interface (GUI) of system 102. The user may provide configuration parameters associated with the metadata scanner 112.

After accessing data source 110 via network 114, metadata scanner 112 may scan the data to read random data samples using identifiers associated with the data store. The metadata scanner 112 extracts the metadata from the random data samples and identifies the schema. The metadata scanner 112 may track schema flavors (e.g., versions of the schema). In some aspects, a flavor or a schema flavor may refer to another schema of the data store that may have overlapping attributes with a schema of the data store. The identifiers (e.g., a key, a primary key) may uniquely identify a record (e.g., a document) in the data store. The type of the identifiers may be determined based on the type of the data store. In some aspects, metadata scanner 112 may determine the type of the data store after connecting to data source 110. Then, metadata scanner 112 may determine a type of the identifier. In some aspects, the identifiers may be a path, a string, or a uniform resource identifier.

As discussed above, metadata scanner 112 may extract the metadata from the data samples. The metadata may include information about a data sample, a table, or the entire data store, but excluding the data stored in the data sample or record.

To extract the data samples, metadata scanner 112 may scan the data using a controlled sampling algorithm. The controlled sampling algorithm is optimized for an initial scan of the data source 110. The controlled sampling algorithm extracts the unique schema from the data store. The controlled sampling algorithm is further described in relation to FIGS. 6A and 6B.

After performing the initial scan, metadata scanner 112 may perform an incremental scan at predefined intervals based on configurations stored in scheduler 108 (e.g., weekly, based on the additional number of records). The metadata scanner 112 may use a delta scanning algorithm for the incremental scan. The delta scanning algorithm is optimized for iterative scans to continuously scan the data store and collect schema. The delta scanning algorithm is further described in relation to FIG. 8. In some aspects, the controlled sampling algorithm and the delta scanning algorithm are deployed in a sequence to improve the accuracy of the extracted schema and track the schema evolution over the life of the data store.

In some embodiments, the controlled sampling algorithm and the delta sampling algorithm may be run in a batch mode or in a distributed mode. The distributed mode provides a comprehensive mode as further described in relation to FIG. 9.

Once the metadata is extracted and processed, system 102 may identify a unique schema and send the uniquely identified schema to metadata management and data governance framework 104. The unique schema may be identified as described in relation to FIG. 10. Metadata management and data governance framework 104 may comprise a data processing system utilizing active metadata, a data catalog, a data lineage and data quality system, or a data privacy solution for detecting sensitive information identified by its metadata. In some aspects, metadata management and data governance framework 104 may perform a data governance task (e.g., consistency or completeness checking, checking that a predefined attribute is included in the schema).

System 102 described above improves the state of the art from conventional systems in a plurality of ways. By providing the ability of extracting metadata and tracking schema from NoSQL data stores, the compliance with data governance is improved. System 102 collects and tracks schema and other desired metadata. The collected data is formatted in a desired format so that it can be retrieved by metadata management and data governance framework 104. This is desired in technological fields or data-driven environments where the data is critical and regulated (e.g., banking system). In data-driven environments, data is critical to decision-making, driving revenue, maintaining a competitive advantage, and achieving regulatory compliance. Regulation laws requires companies dealing with data to implement governance rules to ensure that aspects like data privacy (e.g., right of information, right of erasure) and data quality are enforced. In addition, system 102 has the ability to pull data from different sources such as in a cloud environment (e.g., a cloud based data store).

FIG. 2A is a schematic that illustrates a first flexible schema, in accordance with an embodiment of the present disclosure. FIG. 2B is a schematic that illustrates a second flexible schema, in accordance with an embodiment of the present disclosure. FIG. 2C is a schematic that illustrates a third flexible schema, in accordance with an embodiment of the present disclosure. As discussed above, a data store can receive and store data as desired from various sources without any modification to the data structure itself. Each document in the data store may have a separate set of attributes. FIGS. 2A-2C show data samples from a NoSQL data store (e.g., Couchbase). FIG. 2A shows a first document/record 200 for a first airline. FIG. 2B shows a second document/record 202 associated with a second airline. FIG. 2C shows a third document/record 204 associated with a third airline. In a flexible schema, there may be different variations and/or evolution of schema (e.g., schema for a document/record associated with an airline). Each document/record includes a different number and type of attributes. In this example, third document/record 204 has more attributes compared to first document/record 200 and second document/record 202. Third document/record 204 includes attributes that are not present in first document/record 200 or second document/record 202 such as "schedule" and "route." Second document/record 202 has the fewest amount of attributes compared to first document/record 200 and third document/record 204. A schema may refer to the particular set of attributes or fields for the particular document or record. In comparing the document/records 200, 202, 204, each have different schema.

Figure 3:
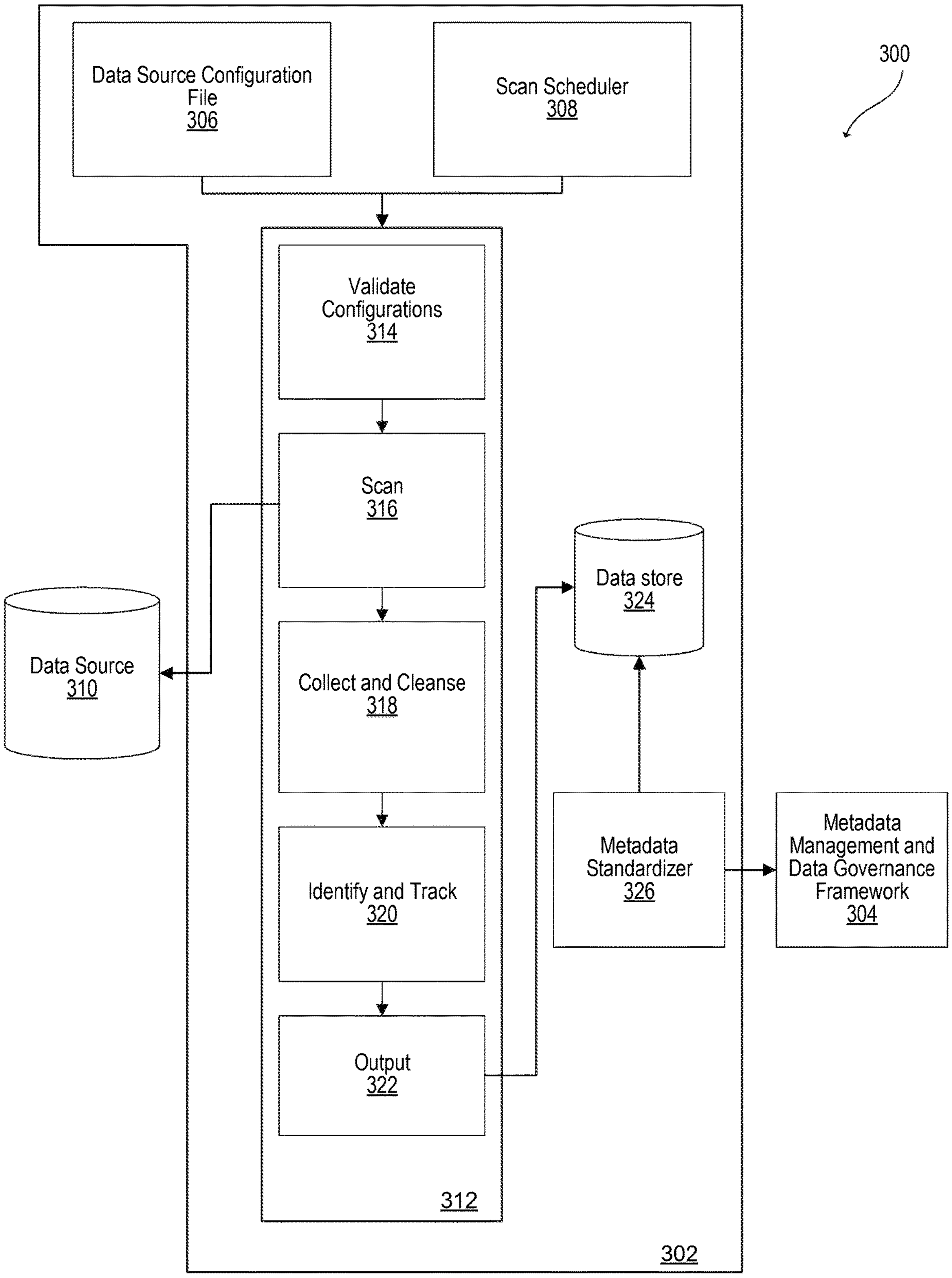
FIG. 3 is a block diagram of an architecture for a system that provides metadata extraction and schema evolution tracking, in accordance with an embodiment of the present disclosure.

FIG. 3 is a block diagram of an architecture for a system 302 that provides metadata extraction and schema evolution tracking, in accordance with an embodiment of the present disclosure. In some aspects, environment 300 may provide a more detailed view of the operation of metadata scanner 112.

System 302 may comprise a data source configuration file 306, a scan scheduler 308, a metadata scanner 312, a data store 324, and a metadata standardizer 326.

In some embodiments, metadata scanner 312 may start by retrieving and validating the configurations at 314. For example, metadata scanner 312 may verify that a sampling percentage is specified in data source configuration file 306. At 316, metadata scanner 312 may connect to a data source 310 to perform a scan based on at least the configurations. At 318, metadata scanner 312 may collect and cleanse the metadata. At 320, metadata scanner 312 may identify and track the metadata. For example, metadata scanner 312 may identify and track the unique schema. At 322, metadata scanner 312 may output the unique schema or other identified metadata to a data store 324. A metadata standardizer 326 may retrieve the stored metadata (e.g., unique schema) from data store 324. Metadata standardizer 326 may standardize the stored metadata in order to conform with a desired standard. After standardizing the metadata, metadata standardizer 326 may output the metadata to a metadata management and data governance framework 304.

Figure 4A:
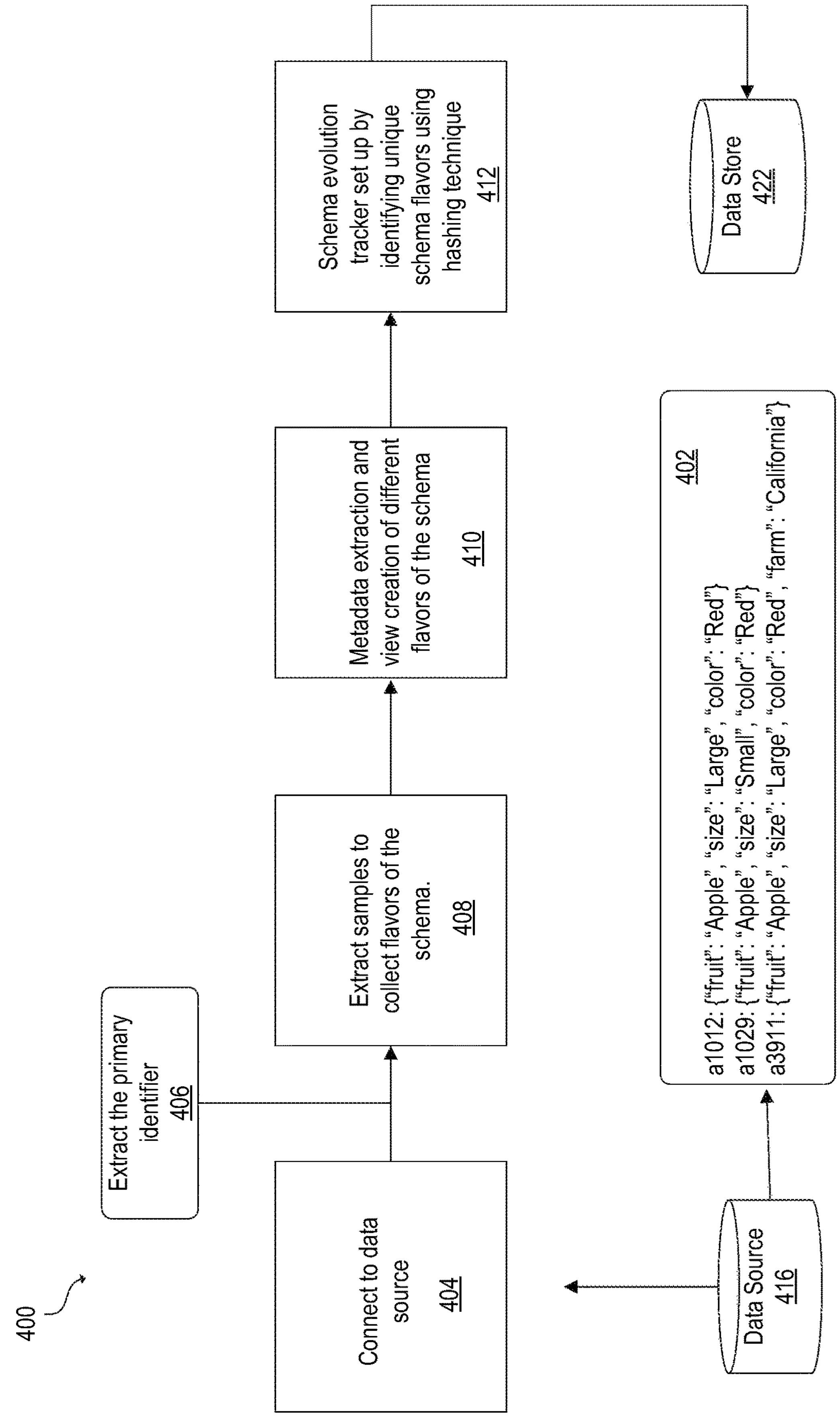
FIG. 4A is a flow diagram that illustrates schema extraction, in accordance with an embodiment of the present disclosure.

FIG. 4A is a flow diagram that illustrates a schema extraction flow 400, in accordance with an embodiment of the present disclosure.

At 404, system 102 may connect to a data source 416 (e.g., a NoSQL data store). System 102 may connect to data source 416 via an application programing interface (API). The API may define how system 102 may access data source 416. The API may comprise java data store connectivity (JDBC), open data store connectivity (ODBC), driver software development kits (SDKs), or the like. Data source 414 may include a plurality of data samples 402. Each data sample may comprise a plurality of key-value. In the example shown, the plurality of data samples includes three records. Each record has a different schema and include different key-value pairs. Each record is associated with a unique identifier.

At 406, identifiers (e.g., primary identifiers) are extracted. FIG. 4B illustrates a plurality of identifiers 414 for a data source, in accordance with an embodiment of the present disclosure. Each identifier uniquely identifies a data sample (e.g., a record or a document in data source 416). The construct of the primary identifier may be based on the data store type (e.g., character, short, integer, long string).

At 408, system 102 may extract a plurality of data samples from data source 416 to collect flavors of the schema. A plurality of data samples are shown in FIG. 4C. The data samples may be extracted in a distributed or in a random fashion as described further below.

At 410, system 102 may extract the metadata from the plurality of data samples. System 102 may create a view (e.g., schema view) of different flavors of the schema. The view may display the different flavors of the schema. Exemplary metadata (e.g., schema) extracted from the data samples are shown in FIG. 4D. FIG. 4D shows the extracted schema associated with each data sample shown in FIG. 4C. As discussed above, the schema may comprise the attribute or key without the value for each attribute or key. Each data sample may have a plurality of attributes associated with the data sample or record. For example, first metadata 418*a* are extracted from a first data sample 420*a* (e.g., "fruit": "Apple", "size": "Large", "color": "Red"). First metadata 418*a* may include fruit, size, and color. These are the set of attributes corresponding to first data sample 420*a*. In this example, first metadata 418*a* may represent a first schema. Similarly, second metadata 418*b* may be extracted from a second data sample 420*b* (e.g., "fruit": "Apple", "size": "Large", "color": "Red", "farm": "California"). Second metadata 418*b* may include fruit, size, color, and farm. The set of attributes identified by second metadata 418*b* may correspond to a second schema.

In 412, system 102 may identify unique schema flavors using a hashing technique. The hashing technique is further described in relation with FIG. 4E. In the example shown in FIG. 4D, first metadata 418*a* and second metadata 418*b* represent the unique schema associated with the extracted data samples shown in FIG. 4C. Thus, first metadata 418*a* and second metadata 418*b* are stored in data store 422. System 102 may track the evolution of schema by storing and tracking the change in the schema and metadata stored in data store 422.

Figure 4E:
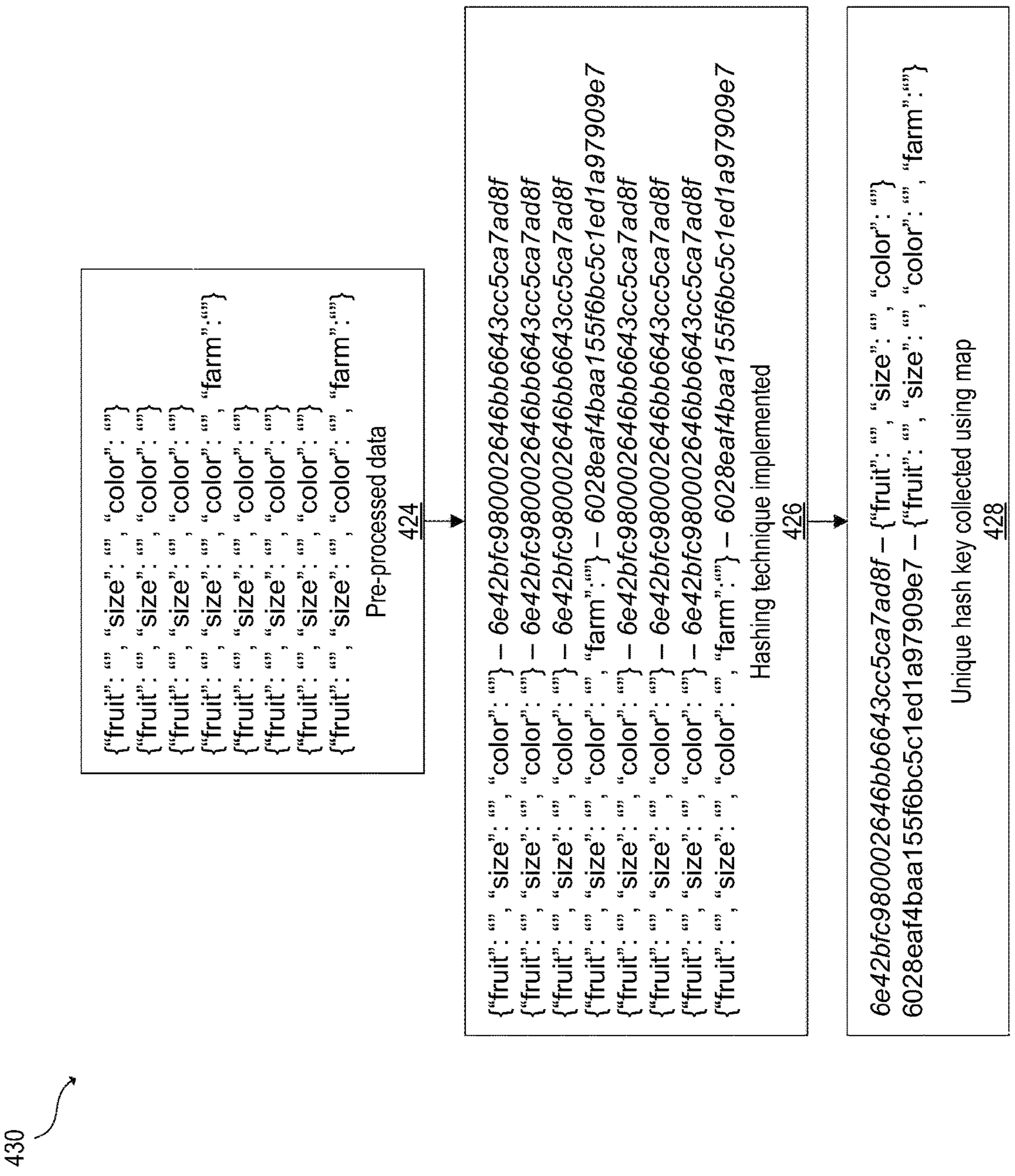
FIG. 4E is a flow diagram that illustrates unique schema identification, in accordance with an embodiment of the present disclosure.

FIG. 4E is a flow diagram 430 that illustrates unique schema identification, in accordance with an embodiment of the present disclosure. As discussed above, unique schema identification may be performed using a hashing technique. The metadata extracted from the data samples may be formatted and processed to create pre-processed data 424. For example, the schema may be extracted from the metadata and formatted. Pre-processed data 424 may include one or more unique schema. At 426, preprocessed data 424 are hashed using a hashing technique. The hashing technique may apply a hash function to generate a hash key. At 428, unique keys are identified from the plurality of hash keys generated at 426. In the example shown in FIG. 4E, two unique hash keys are identified from the plurality of hash keys. The two unique keys are collected and stored in data store 422. In some aspects, the unique keys may be collected in a hash table (also referred to as a hash map) that pairs the hash key with the schema.

Figure 5:
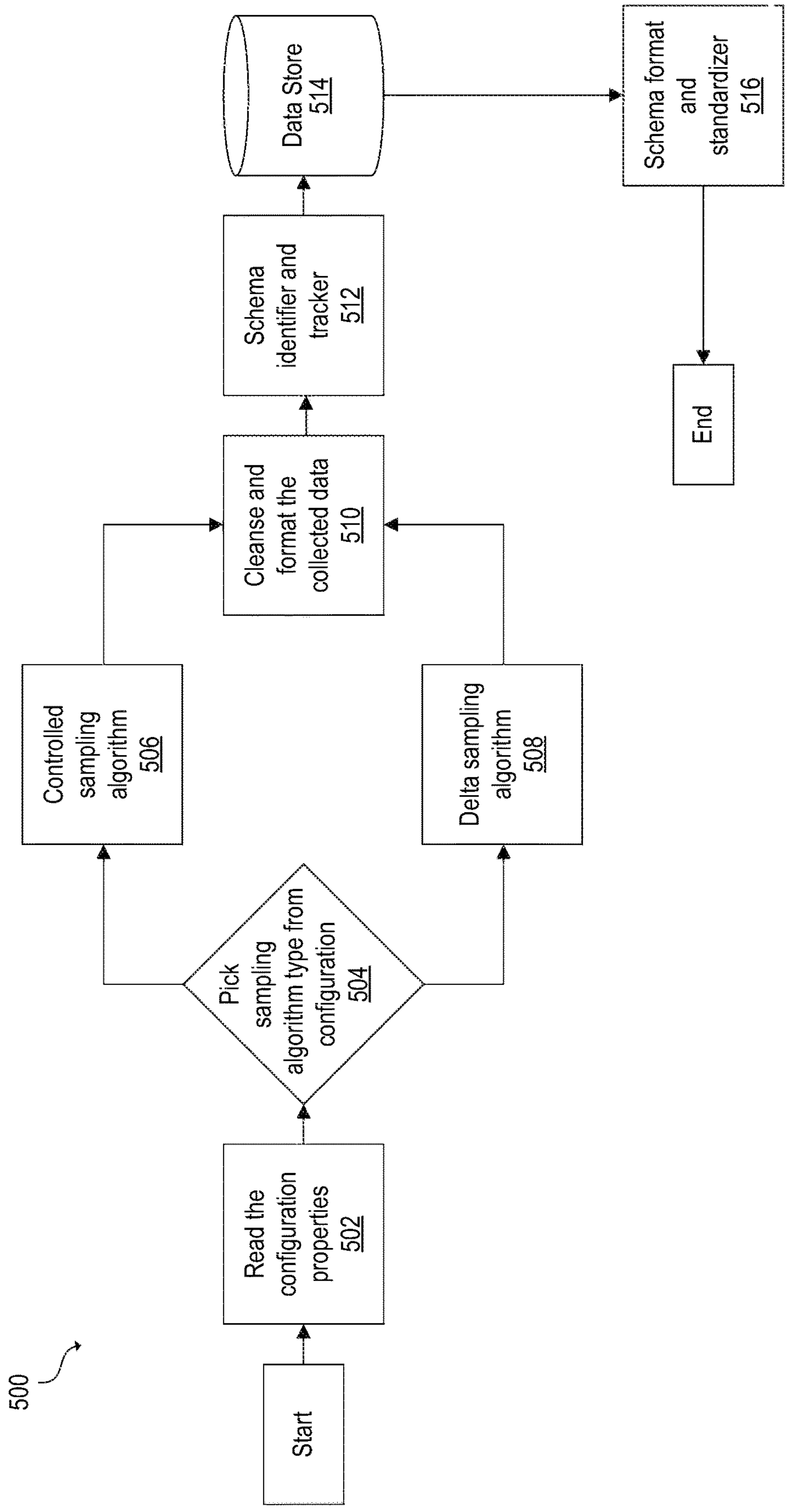
FIG. 5 is a flow diagram that illustrates a scanning process flow, in accordance with an embodiment of the present disclosure.

FIG. 5 is a flow diagram that illustrate a scanning process flow 500, in accordance with an embodiment of the present disclosure. At 502, system 102 may read the configuration properties. For example, system 102 may read the configuration properties from data source configuration file 106.

At 504, system 102 may identify a sampling algorithm type based on the configuration properties. The configuration properties may include one or more attributes indicative of whether the data source was scanned and a date stamp of the last scan. The sampling algorithms may include a controlled sampling algorithm and a delta sampling algorithm.

In response to identifying the sampling algorithm as the controlled sampling algorithm, the controlled sampling algorithm is executed at 506. In response to identifying the sampling algorithm as the delta sampling algorithm, the data samples are extracted using the delta sampling algorithm at 508.

At 510, the collected data is cleansed and formatted. For example, the schema may be extracted from the metadata. In some aspects, schema and other metadata may be collected. In some aspects, the collected data is cleansed to remove extra space, characters, and the like.

At 512, system 102 may identify and extract the unique schema as described previously herein. The extracted metadata are stored in a data store 514. The data store 514 may correspond to data store 422 of FIG. 4A. At 516, system 102 may format the schema using a predefined standard.

In some aspects, in a subsequent sampling of the data store, system 102 may compare the newly identified schema to schema stored in data store 514 to determine whether the newly identified schema are unique with respect to the stored schema.

As discussed above system 102 may extract the data sample using a controlled sampling algorithm, the controlled sampling algorithm provides a sampling mechanism to capture the metadata from the data source (e.g., NoSQL data store). The algorithm uses distributed processing to scan the target data source and mark offsets to determine which records are identified (e.g., selected) for sampling. The selected records are processed for metadata extraction. Additionally, the algorithm can be configured to extract a percentage of the entire data store volume for sampling or can be configured with a set number of records to be sampled.

The sampling percentage and the number of datasets (i.e., thread, parallel processing) may be set by a user. The total count of records in the data store may be retrieved. For example, system 102 may connect to the data store and based on the type of data store using a specific command to retrieve the number of records in the data store. The number of records per dataset may be determined based on the sampling percentage, the number of datasets, and the number of records. After determining the number of records per dataset, a start and an end offset values for each dataset are determined. The offset values to be extracted for each dataset based on records per dataset and iteration number is determined.

Figure 6A:
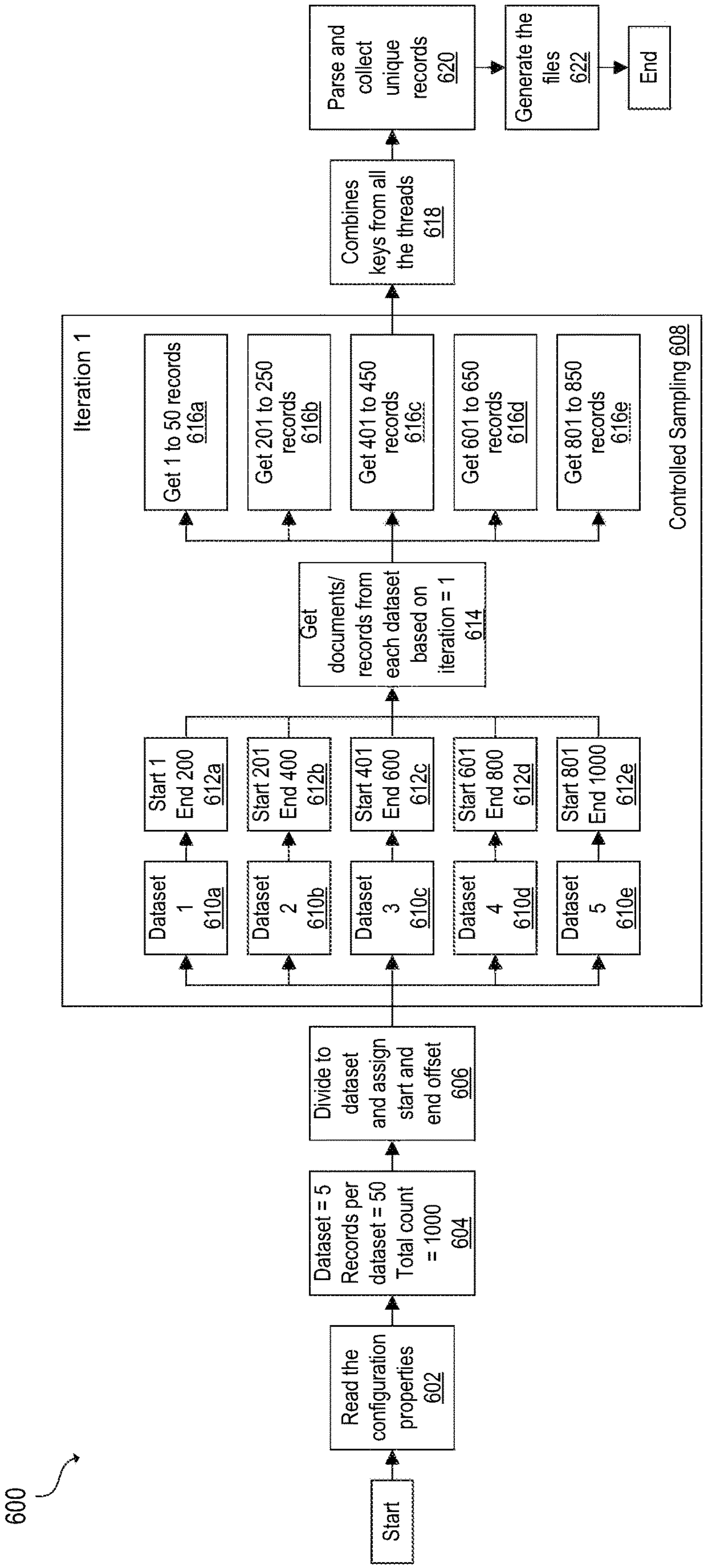
FIG. 6A is a flow diagram that illustrates an iteration of a controlled sampling process, in accordance with an embodiment of the present disclosure.

FIG. 6A is a flow diagram 600 that illustrates a first iteration of a controlled sampling process 608, in accordance with an embodiment of the present disclosure. At 602, the configuration properties are read and the number of records in the data store is determined. In the illustrative example shown in FIG. 6A, the number of records in the data store is equal to 1000. Configuration properties 604 may comprise the sampling percentage (equals to 25%) and the number of datasets (equals to five). Thus, the total number of record to be collected for sampling for each iteration is equal to 250 (i.e., 1000×25)/100=250). At 606, the records are divided into datasets and the start and end offset values are assigned. In the illustrative example, the records are divided into five different data sets. Thus, each dataset includes 200 records (i.e., 1000 records/5=200 records). The records are divided into the following datasets: dataset 610*a*, dataset 610*b*, dataset 610*c*, dataset 610*d*, and dataset 610*e*. Each dataset of dataset 610*a*, dataset 610*b*, dataset 610*c*, dataset 610*d*, and dataset 610*e* includes 200 records.

After dividing the records into datasets, a start offset value and an end offset value for each dataset are determined. Dataset 610*a* may have a start offset value and an end offset value 612*a*. Dataset 610*b* may have a start offset value and an end offset value 612*b*. Dataset 610*c* may have a start offset value and an end offset value 612*c*. Dataset 610*d* may have a start offset value and an end offset value 612*d*. Dataset 610*e* may have a start offset value and an end offset value 612*e*.

Start offset value and end offset value 612*a* for dataset 610*a* are 1 and 200, respectively. Start offset value and end offset value 612*b* for dataset 610*b* are 201 and 400, respectively. Start offset value and end offset value 612*c* for dataset 610*c* are 401 and 600 respectively. Start offset value and end offset value 612*d* for dataset 610*d* are 601 and 800 respectively. Start offset value and end offset value 612*e* for dataset 610*e* are 801 and 1000 respectively.

At 614, the records to be collected per set for the first iteration are determined. Records to be collected per set is equal to the total records for sampling/number of sets=250/5=50 records. Thus for the first iteration, records 616*a* to be retrieved for dataset 610*a* are record 1 to record 50. Records 616*b* to be retrieved for dataset 610*b* are record 201 to record 250. Records 616*c* to be retrieved for dataset 610*c* are record 401 to record 450. Records 616*d* to be retrieved for dataset 610*d* are records 601 to 650. Records 616*e* to be retrieved for dataset 610*e* are records 801 to 850.

At 618, the hash keys from all the threads are combined. The hash keys may be determined as described previously herein.

At 620, the unique records are parsed and the unique schema are collected.

At 622, output files are generated. The output files may have a format compatible with a governance tool. In addition, the configuration files may be updated. For example, the maximum offset that was scanned may be stored or updated.

In the example shown in FIG. 6A, in order to scan the entire data store four iterations are used. The offsets may be calculated as follows:

$$\text{Iteration 1: Iteration} * \text{Set Start Offset}$$

$$\text{Iteration 2: (Iteration} - 1) * \text{Records per dataset} + \text{Set Start Offset}$$

Given the range of sets:
Set 1=1 to 200
Set 2=201 to 400
Set 3=401 to 600
Set 4=601 to 800
Set 5=801 to 1000

The offsets may be calculated as follows:

$$\text{Iteration} = 1,\ \text{Set} = 1 => 1*1 = 1$$

$$\text{Iteration} = 2,\ \text{Set} = 2 => (2-1)*50+201 = 251$$

$$\text{Iteration} = 3,\ \text{Set} = 4 => (3-1)*50+601 = 701$$

Figure 6B:
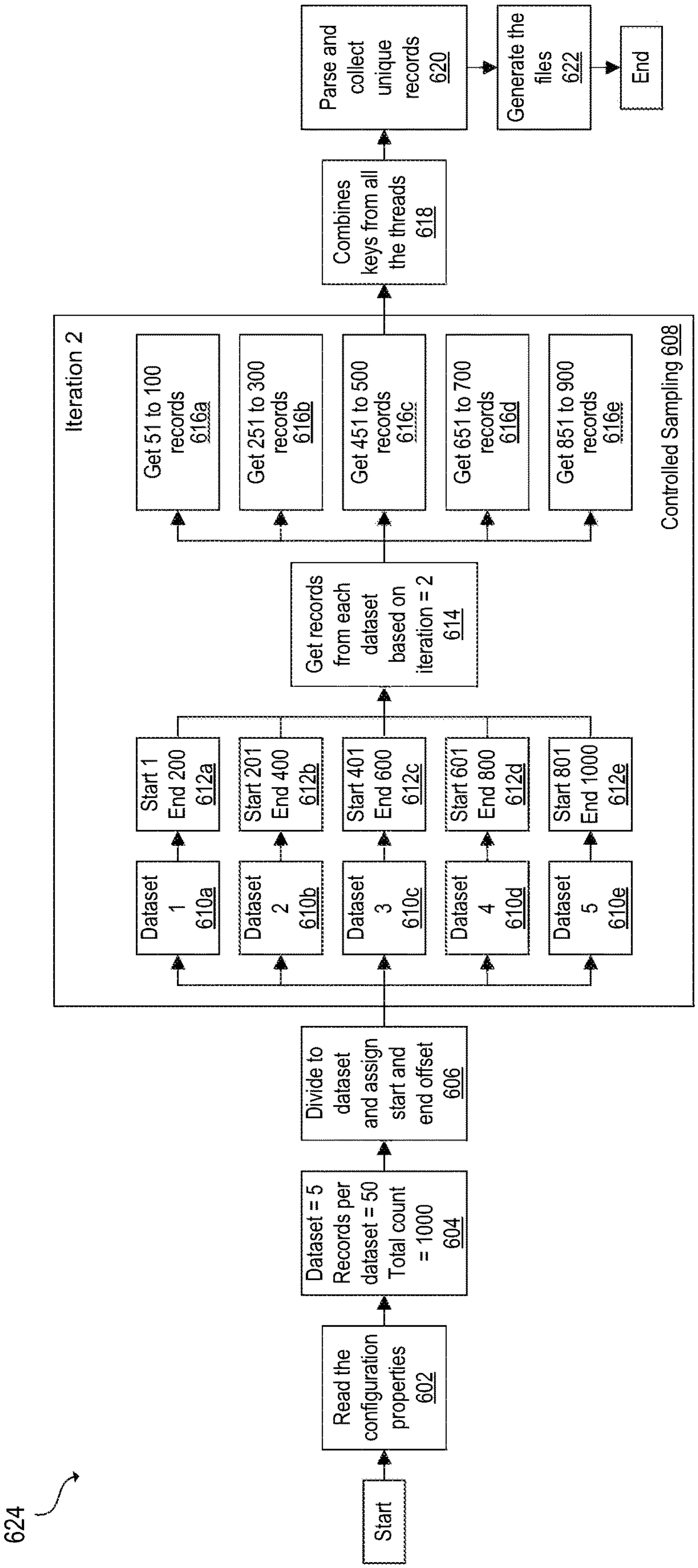
FIG. 6B is a flow diagram that illustrates another iteration of the controlled sampling process, in accordance with an embodiment of the present disclosure.

The second iteration for the above example is shown in FIG. 6B. Records 616*a* to be retrieved for dataset 610*a* are records 51 to 100. Records 616*b* to be retrieved for dataset 610*b* are records 251 to 300. Records 616*c* to be retrieved for dataset 610*c* are records 451 to 500. Records 616*d* to be retrieved for dataset 610*d* are records 651 to 700. Records 616*e* to be retrieved for dataset 610*e* are records 851 to 900.

Figure 7:
FIG. 7 is a diagram that illustrates a pseudo code for the controlled sampling process, in accordance with an embodiment of the present disclosure.

FIG. 7 is a diagram that illustrates a pseudo code 700 for the controlled sampling process, in accordance with an embodiment of the present disclosure. As described above, four iterations are used in order to scan all the records in the data store. For example, for the first data set that includes (records from 1 to 200) records 1 to 50 are scanned in the first iteration. In the second iteration records 51 to 100 are scanned. In the third iteration, records 101 to 150 are scanned. In the fourth iteration, records 151 to 200 are scanned.

In addition to the controlled sampling algorithm described above, the meta scanner may use a delta sampling algorithm. As described above, the delta sampling algorithm provides an iterative sampling mechanism to capture changes to the schema of the data store. In some aspects, the delta sampling algorithm builds on the controlled sampling algorithm by denoting the last offset in the data store where the last scan ended and starts scanning from that offset point to collect the incremental changes to the schema and track its evolution. Based on the total count of records in the data store and the previous scanned offset values, the algorithm divides the records into multiple datasets and assigns start and end offset values for each dataset.

Figure 8:
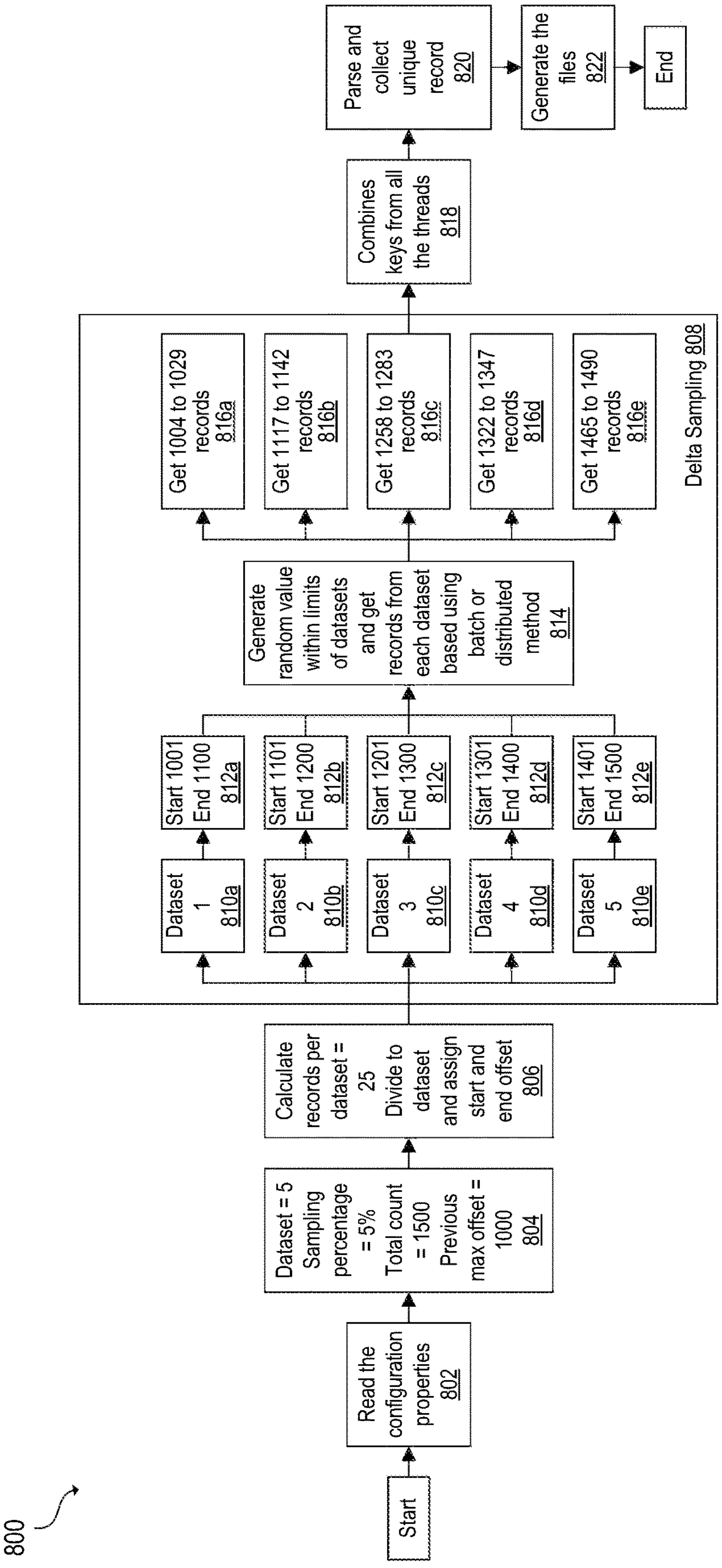
FIG. 8 is a flow diagram that illustrates a delta sampling process, in accordance with an embodiment of the present disclosure.

FIG. 8 is a flow diagram 800 that illustrates a delta sampling process 808, in accordance with an embodiment of the present disclosure. At 802, the configuration properties are read and the number of records in the data store is determined. In the illustrated example, the number of records in the data store is equal to 1500. Configuration properties 804 may comprise the sampling percentage (equals to 5%). A previous maximum offset is equal to 1000.

At 806, the number of records per dataset to be collected is determined based on the previous offset value and the sampling percentage. In the illustrative example, there are 500 additional records. Thus, there are 25 records to be selected for each data set.

The start and end offset values for each dataset are assigned. The offset mechanism is determined based on the total count. The maximum offset information for each run in the data store for every target data store/table is determined. The offsets greater than maximum offset and less than total count are generated.

For example, the start offset value and end offset value 812*a* for dataset 810*a* are 1001 and 1100, respectively. Start offset value and end offset value 812*b* for dataset 810*b* are 1101 and 1200, respectively. Start offset value and end offset value 812*c* for dataset 810*c* are 1201 and 1300, respectively. Start offset value and end offset value 812*d* for dataset 810*d* are 1301 and 1400, respectively. Start offset value and end offset value 812*e* for dataset 810*e* are 1401 and 1500 respectively.

At 814, an intelligently randomized value for each dataset based on start and end assigned values (within the limits of each dataset) is generated. Then, the records are retrieved from each data set. The records may be retrieved using the batch method or the distributed method as described further below. The records to be retrieved for dataset 810*a* are records 816*a* (e.g., from 1004 to 1029). The records to be retrieved for dataset 810*b* are records 816*b* (e.g., from 1117 to 1142). The records to be retrieved for dataset 810*c* are records 816*c* (e.g., from 1258 to 1283). The records to be retrieved for dataset 810*d* are records 816*d* (e.g., from 1322 to 1347). The records to be retrieved for dataset 810*e* are records 816*e* (e.g., from 1465 to 1490). Then, all the unique keys associated with all the records extracted from datasets 810*a*, . . . , 810*e* are combined, at 818.

At 820, the combined keys are parsed and the associated records are extracted. At 822, the output files are generated.

In accordance with a non-limiting example, this can be accomplished using the following pseudo code.

```
Run 1: Batch algorithm type and inserted offset information in the DB.
Run 2: Delta algorithm:
Get total count.
Get previous maximum offset.
total_count = 1000, previous_max = 790
sampling_percent = 1 (from config)
sampling_records = 10 (from config)
datasets_no = 5 (from config)
per_dataset = 2
Using random batch or distributed algorithm generate offsets
based on sampling percentage between 790 and 1000
Generated offset keys: 8, 15, 44, 101, 121
Final offset keys: 790 + 8, 790 + 15, 790 + 44, 790 + 101, 790 + 121 ->
798, 805, 834, 891, 911
```

As discussed above the metadata may be extracted using a controlled sampling algorithm or a delta sampling algorithm. These two algorithms can be run in the following modes: the batch mode or the distributed mode. The batch mode is a highly performant mode that extracts metadata in batches. The batch mode provides the advantage of being an efficient mode. Using the batch mode, there is chance of record overlap in consecutive batches. However, the extracted records will not be exact duplicates as extracted records in previous iterations.

In batch mode, the total count of the records in the data source may be determined. For example, the total count of the records may be retrieved by metadata scanner 112 after connecting to data source 110. Then, the sampling percentage and the number of datasets are retrieved. In some aspects, the sampling percentage and the number of datasets may be configured by a user. In a non-limiting illustrative example, the total record count is equal to 1000. The sampling percentage may be equal to 25% (e.g., retrieved from data source configuration 106). Thus, the total records to be collected for sampling is equal to 250 records (i.e., (1000×25)/100=250 records). The number of datasets may also be retrieved from the data source configuration file. In a non-liming illustrative example, the number of datasets may be equal to 10. The total records are divided into 10 different datasets. Thus, each dataset may have 100 records (i.e., 1000/10=100 records).

Based on the sampling percentage and the number of datasets, the number of records to collected per dataset is determined. In some aspects, the number of records to be collected per dataset may be equal to the total records for sampling over the number of datasets. In the illustrative example, the records to be collected per dataset is equal to 25 (i.e., 250/10). After determining the number of records to be collected per dataset, a random value is generated and added to the offsets.

In some embodiments, the records are extracted using the distributed mode. The records are dynamically sampled using an intelligent randomizer as opposed to statically picking the records from each dataset as in the batch mode. The distributed mode is a comprehensive mode.

Figure 9:
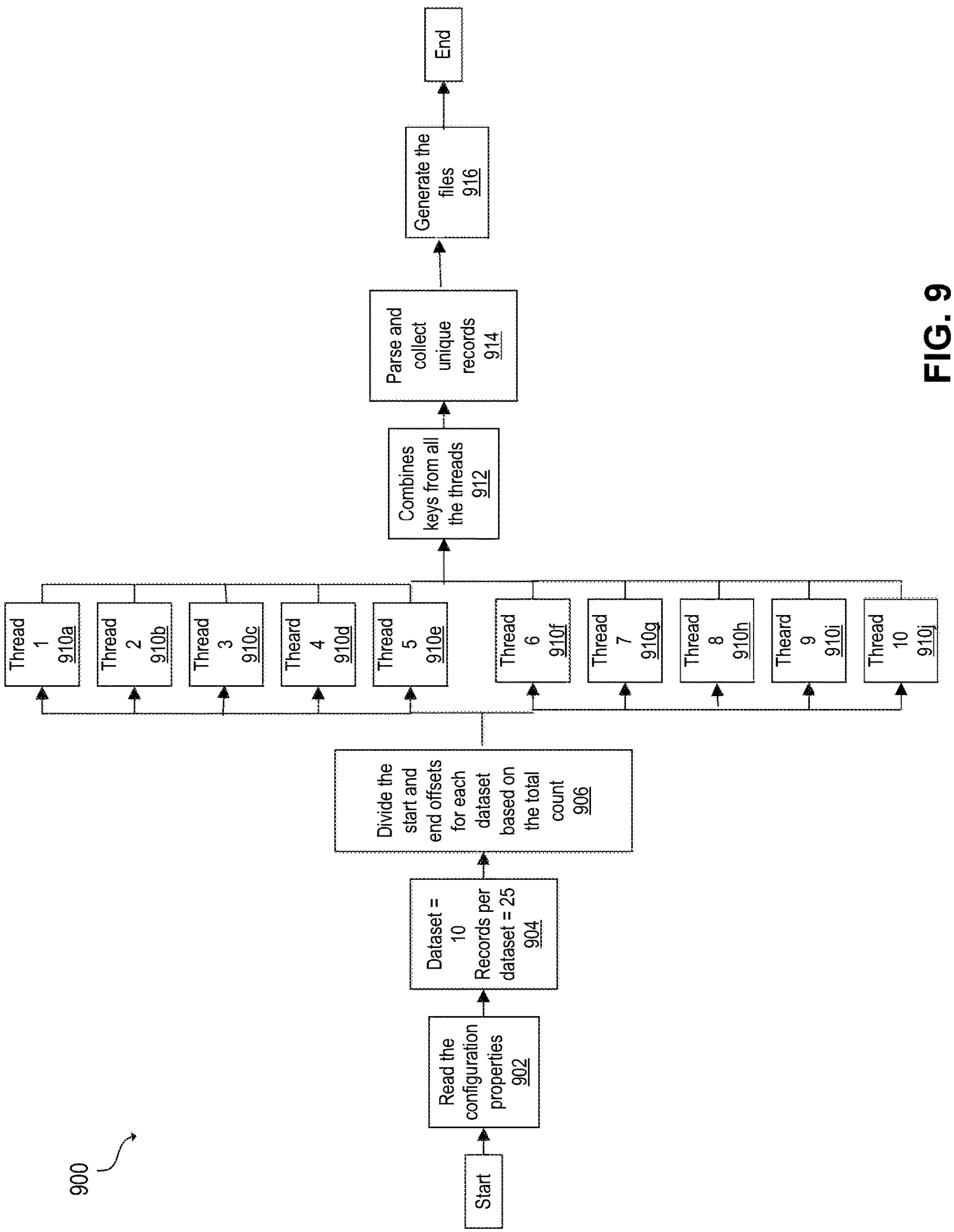
FIG. 9 is a flow diagram that illustrates a distributed mode for scanning a data source, in accordance with an embodiment of the present disclosure.

FIG. 9 is a flow diagram 900 that illustrates a distributed mode for scanning a data source, in accordance with an embodiment of the present disclosure. At 902, the configuration properties are determined. For example, the configuration properties may be read from data source configuration file 106. At 904, the number of records to be retrieved from each data set is determined. At 906, the start and end offsets for each dataset are determined based on the total count.

In a non-limiting illustrative example, the total record count is equal to 1000. The sampling percentage may be equal to 25% (e.g., retrieved from data source configuration 106). Thus, the total records to be collected for sampling is equal to 250 records (i.e., (1000×25)/100=250 records). The number of datasets may also be retrieved from the data source configuration file. In a non-liming illustrative example, the number of datasets may be equal to 10. The total records are divided into 10 different datasets. Thus, each dataset may have 100 records (i.e., 1000/10=100 records). Based on the sampling percentage and the number of datasets, the number of records to collected per dataset is determined. In some aspects, the number of records to be collected per dataset may be equal to the total records for sampling over the number of datasets. In the illustrative example, the number of records to be collected per dataset is equal to 25 (i.e., 250/10). In some aspects, random numbers equals to the number of records are generated using a random number generator (e.g., using an inbuilt function in java). The performance of system 102 may be decreased using the randomized but the accuracy is improved as every time the scanner is triggered a different set of records are picked. Thus, 25 random records are extracted from each data set or thread (e.g., thread 910*a*, thread 910*b*, thread 910*c*, thread 910*d*, thread 910*e*, thread 910*f*, thread 910*g*, thread 910*h*, thread 910*i*, and thread 910*j*)

At 912, keys extracted from all the threads are combined. At 914, the combined keys are parsed and records associated with the unique keys are collected. At 916, the output files are generated.

As described above, every sampled record and the extracted metadata associated with the sampled record are hashed to create a unique identifier. The unique identifier is used to identify and denote a schema and track the schema through the life of the data source (e.g., data store).

Figure 10:
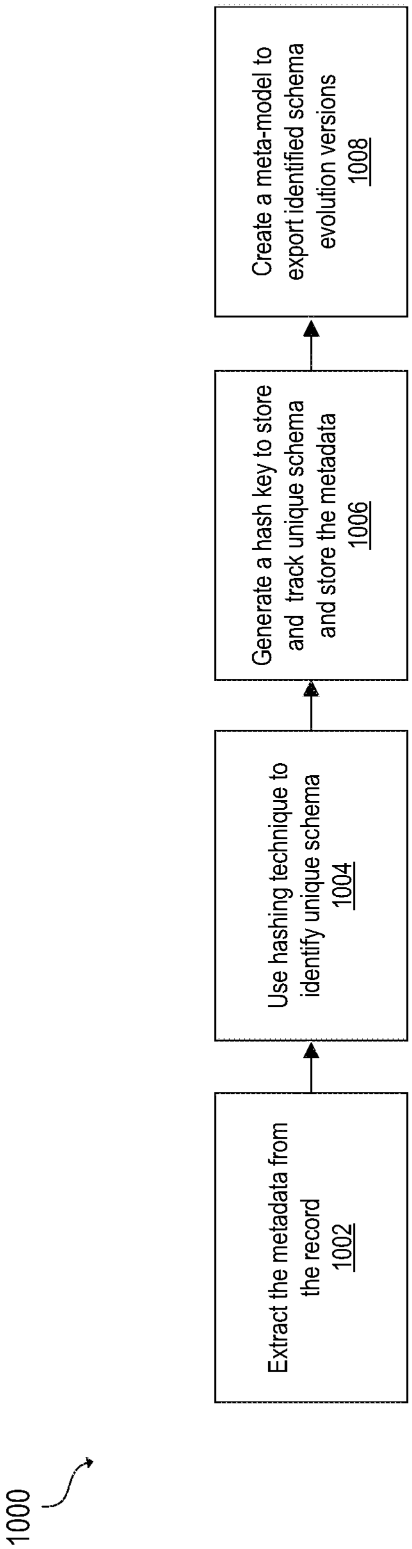
FIG. 10 is a flow diagram that illustrates a process for schema evolution tracking, in accordance with an embodiment of the present disclosure.

FIG. 10 is a flow diagram that illustrates a process 1000 for schema evolution tracking, in accordance with an embodiment of the present disclosure.

At 1002, the metadata from the record are extracted. The metadata is extracted as described previously herein.

At 1004, unique schema are identified using a hashing technique.

At 1006, a hash key is generated. The hash key is used to store and track the unique schema. In addition, the hash key may be used to store the metadata. For example, the hash key and associated metadata are stored in a hash table or map.

At 1008, a metamodel may be created to export identified schema evolution versions. In some aspects, the metamodel may be standardize for consumption in subsequent modules. For example, the metamodel may include a hash key, a data type, and a flattened hierarchy of the associated data sample. The metamodel may also be reformatted to a desired format used by one or more enterprise data governance (EDG) tools. For example, the metamodel may be reformatted as a comma-separated values file (CSV) output file. The CSV output may be uploaded to a specified path. The CSV output may be used for data lineage. The metamodel may also be formatted into a JSON output file. The JSON output may be used for data catalog.

Methods of Operation

Figure 11:
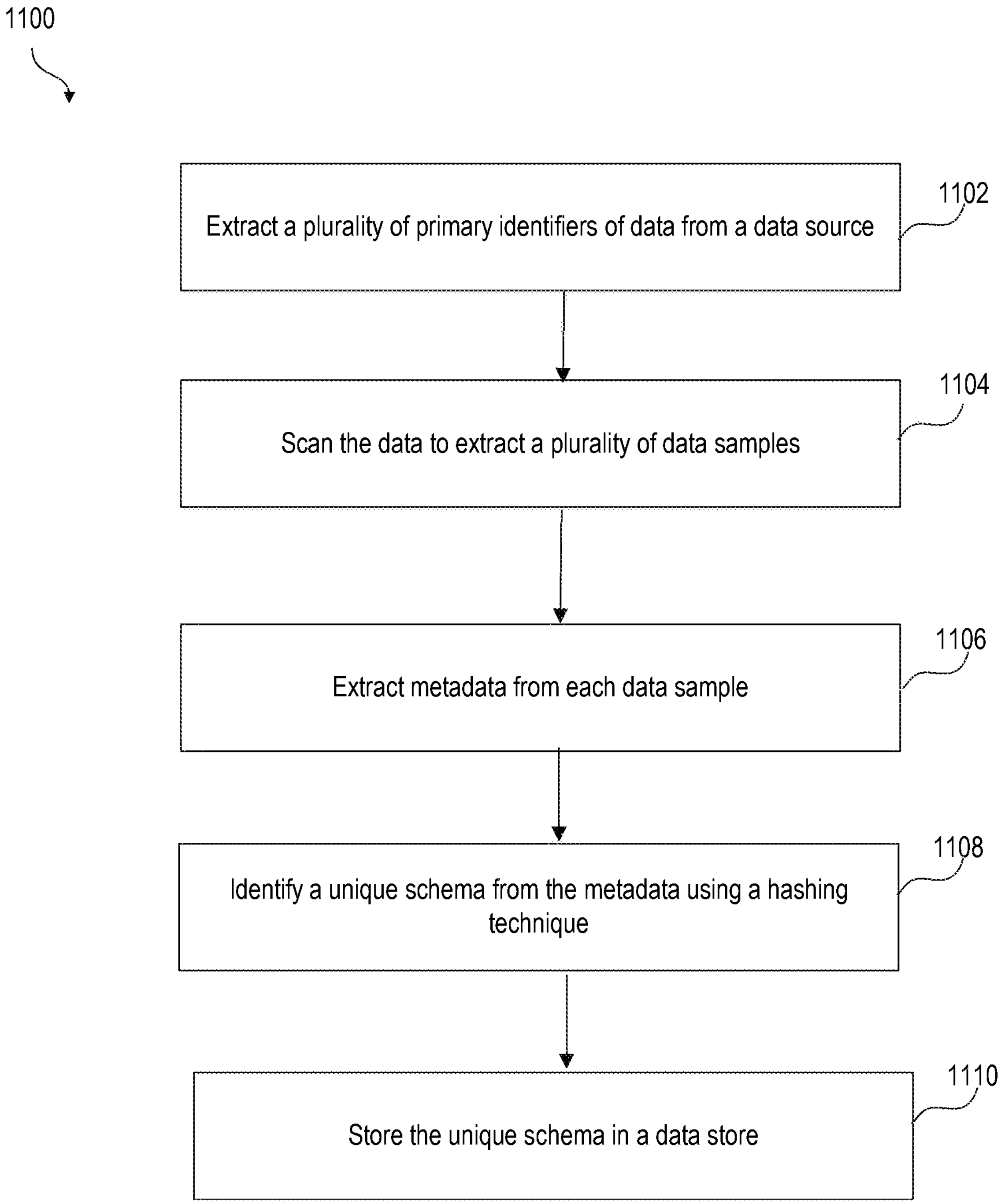
FIG. 11 is an example method of operating the system for metadata extraction and schema evolution tracking, in accordance with an embodiment of the present disclosure.

FIG. 11 is an example method 1100 of operating system 102 for extracting metadata and tracking schema evolution in accordance with an embodiment of the present disclosure. Method 1100 may be performed as a series of steps by a computing unit such as a processor.

At 1102, system 102 may extract a plurality of identifiers of data from a data source. An identifier uniquely identifies a record in the data source.

At 1104, system 102 may scan the data to extract a plurality of data samples from the data store using the plurality of identifiers. In some aspects, the data samples are extracted in batches from the data source. The number of batches is a function of a total count of records in the data source and a sampling percentage. In some aspects, the data samples are extracted from the data source using a random distribution technique.

At 1106, system 102 may extract metadata from each data sample of the plurality of data samples. The metadata comprises schema indicative of one or more attributes of each respective data sample. In some aspects, system 102 may format the extracted metadata.

At 1108, system 102 may hash the metadata of each respective data sample to generate a respective hash value associated with each respective data sample of the plurality of data samples.

At 1110, system 102 may compare the hash values to identify one or more unique hash values.

At 1112, system 102 may identify one or more unique schema corresponding to the one or more unique hash values.

At 1114, system 102 may store the one or more unique schema in a data store. In some aspects, system 102 may output the one or more unique schema to an external governance the tool. Prior to outputting the unique schema, system 102 may format the schema using a standardized format.

Components of the System

Figure 12:
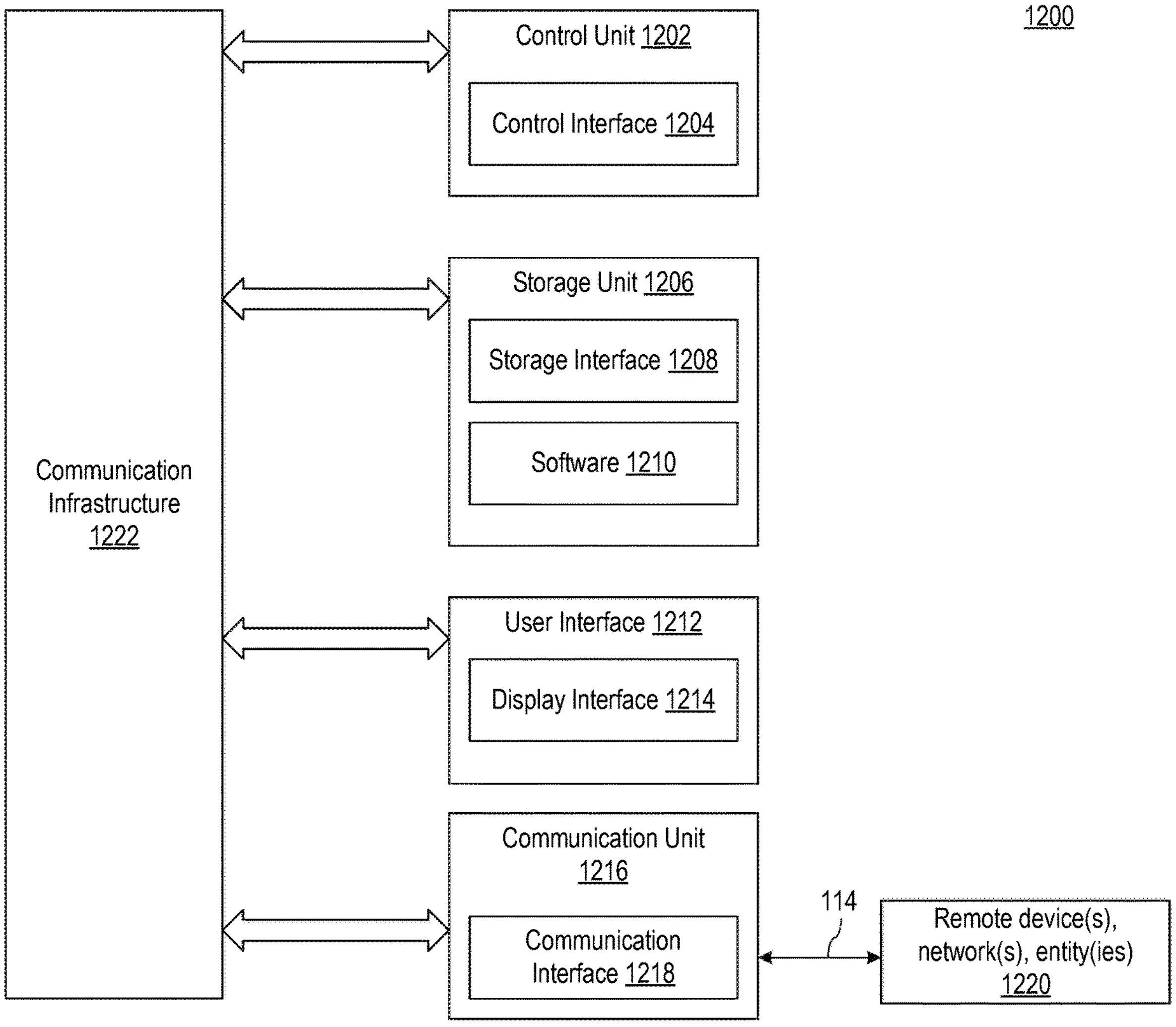
FIG. 12 is an example architecture of components for devices that may be used to implement the system, in accordance with an embodiment of the present disclosure.

FIG. 12 is an example architecture 1200 of components for devices that may be used to implement system 102 according to aspects. The components may be the components of the computing device or servers on which system 102 is implemented. In aspects, the components may include a control unit 1202, a storage unit 1206, a communication unit 1216, and a user interface 1212. The control unit 1202 may include a control interface 1204. The control unit 1202 may execute a software 1210 to provide some or all of the intelligence of system 102. The control unit 1202 may be implemented in a number of different ways. For example, the control unit 1202 may be a processor, an application specific integrated circuit (ASIC), an embedded processor, a microprocessor, a hardware control logic, a hardware finite state machine (FSM), a digital signal processor (DSP), a field programmable gate array (FPGA), or a combination thereof.

The control interface 1204 may be used for communication between the control unit 1202 and other functional units or devices of system 102. The control interface 1204 may also be used for communication that is external to the functional units or devices of system 102. The control interface 1204 may receive information from the functional units or devices of system 102, or from remote devices 1220, such a client device, or may transmit information to the functional units or devices of system 102, or to remote devices 1220. The remote devices 1220 refer to units or devices external to system 102.

The control interface 1204 may be implemented in different ways and may include different implementations depending on which functional units or devices of system 102 or remote devices 1220 are being interfaced with the control unit 1202. For example, the control interface 1204 may be implemented with a pressure sensor, an inertial sensor, a microelectromechanical system (MEMS), optical circuitry, waveguides, wireless circuitry, wireline circuitry to attach to a bus, an application programming interface, or a combination thereof. The control interface 1204 may be connected to a communication infrastructure 1222, such as a bus, to interface with the functional units or devices of system 102 or remote devices 1220.

The storage unit 1206 may store the software 1210. For illustrative purposes, the storage unit 1206 is shown as a single element, although it is understood that the storage unit 1206 may be a distribution of storage elements. Also for illustrative purposes, the storage unit 1206 is shown as a single hierarchy storage system, although it is understood that the storage unit 1206 may be in a different configuration. For example, the storage unit 1206 may be formed with different storage technologies forming a memory hierarchical system including different levels of caching, main memory, rotating media, or off-line storage. The storage unit 1206 may be a volatile memory, a nonvolatile memory, an internal memory, an external memory, or a combination thereof. For example, the storage unit 1206 may be a nonvolatile storage such as nonvolatile random access memory (NVRAM), Flash memory, disk storage, or a volatile storage such as static random access memory (SRAM) or dynamic random access memory (DRAM).

The storage unit 1206 may include a storage interface 1208. The storage interface 1208 may be used for communication between the storage unit 1206 and other functional units or devices of system 102. The storage interface 1208 may also be used for communication that is external to system 102. The storage interface 1208 may receive information from the other functional units or devices of system 102 or from remote devices 1220, or may transmit information to the other functional units or devices of system 102 or to remote devices 1220. The storage interface 1208 may include different implementations depending on which functional units or devices of system 102 or remote devices 1220 are being interfaced with the storage unit 1206. The storage interface 1208 may be implemented with technologies and techniques similar to the implementation of the control interface 1204.

The communication unit 1216 may enable communication to devices, components, modules, or units of system 102 or to remote devices 1220. For example, the communication unit 1216 may permit the system 102 to communicate between the servers on which the system 102 is implemented and the client device. The communication unit 1216 may further permit the devices of system 102 to communicate with remote devices 1220 such as an attachment, a peripheral device, or a combination thereof through the network 114.

As previously indicated with respect to FIG. 1, the network 114 may span and represent a variety of networks and network topologies. For example, the network 114 may be a part of a network and include wireless communication, wired communication, optical communication, ultrasonic communication, or a combination thereof. For example, satellite communication, cellular communication, Bluetooth, Infrared Data Association standard (IrDA), wireless fidelity (WiFi), and worldwide interoperability for microwave access (WiMAX) are examples of wireless communication that may be included in the network 114. Cable, Ethernet, digital subscriber line (DSL), fiber optic lines, fiber to the home (FTTH), and plain old telephone service (POTS) are examples of wired communication that may be included in the network 114. Further, the network 114 may traverse a number of network topologies and distances. For example, the network 114 may include direct connection, personal area network (PAN), local area network (LAN), metropolitan area network (MAN), wide area network (WAN), or a combination thereof.

The communication unit 1216 may also function as a communication hub allowing system 102 to function as part of the network 114 and not be limited to be an end point or terminal unit to the network 114. The communication unit 1216 may include active and passive components, such as microelectronics or an antenna, for interaction with the network 114.

The communication unit 1216 may include a communication interface 1218. The communication interface 1218 may be used for communication between the communication unit 1216 and other functional units or devices of system 102 or to remote devices 1220. The communication interface 1218 may receive information from the other functional units or devices of system 102, or from remote devices 1220, or may transmit information to the other functional units or devices of the system 102 or to remote devices 1220. The communication interface 1218 may include different implementations depending on which functional units or devices are being interfaced with the communication unit 1216. The communication interface 1218 may be implemented with technologies and techniques similar to the implementation of the control interface 1204.

The user interface 1212 may present information generated by system 102. In aspects, the user interface 1212 allows the users to interface with the system 102. The user interface 1212 can allow users of the system 102 to interact with the system 102. The user interface 1212 may include an input device and an output device. Examples of the input device of the user interface 1212 may include a keypad, buttons, switches, touchpads, soft-keys, a keyboard, a mouse, or any combination thereof to provide data and communication inputs. Examples of the output device may include a display interface 1214. The control unit 1202 may operate the user interface 1212 to present information generated by system 102. The control unit 1202 may also execute the software 1210 to present information generated by system 102, or to control other functional units of system 102. The display interface 1214 may be any graphical user interface such as a display, a projector, a video screen, or any combination thereof.

The terms "module" or "unit" referred to in this disclosure can include software, hardware, or a combination thereof in an aspect of the present disclosure in accordance with the context in which the term is used. For example, the software may be machine code, firmware, embedded code, or application software. Also for example, the hardware may be circuitry, a processor, a special purpose computer, an integrated circuit, integrated circuit cores, or a combination thereof. Further, if a module or unit is written in the system or apparatus claims section below, the module or unit is deemed to include hardware circuitry for the purposes and the scope of the system or apparatus claims.

The modules or units in the following description of the aspects may be coupled to one another as described or as shown. The coupling may be direct or indirect, without or with intervening items between coupled modules or units. The coupling may be by physical contact or by communication between modules or units.

The above detailed description and aspects of the disclosed system 102 are not intended to be exhaustive or to limit the disclosed system 102 to the precise form disclosed above. While specific examples for system 102 are described above for illustrative purposes, various equivalent modifications are possible within the scope of the disclosed system 102, as those skilled in the relevant art will recognize. For example, while processes and methods are presented in a given order, alternative implementations may perform routines having steps, or employ systems having processes or methods, in a different order, and some processes or methods may be deleted, moved, added, subdivided, combined, or modified to provide alternative or sub-combinations. Each of these processes or methods may be implemented in a variety of different ways. Also, while processes or methods are at times shown as being performed in series, these processes or blocks may instead be performed or implemented in parallel, or may be performed at different times.

The resulting method 1100 and system 102 are cost-effective, highly versatile, and accurate, and may be implemented by adapting components for ready, efficient, and economical manufacturing, application, and utilization. Another important aspect of aspects of the present disclosure is that it valuably supports and services the historical trend of reducing costs, simplifying systems, and/or increasing performance.

These and other valuable aspects of the present disclosure consequently further the state of the technology to at least the next level. While the disclosed aspects have been described as the best mode of implementing system 102, it is to be understood that many alternatives, modifications, and variations will be apparent to those skilled in the art in light of the descriptions herein. Accordingly, it is intended to embrace all such alternatives, modifications, and variations that fall within the scope of the included claims. All matters set forth herein or shown in the accompanying drawings are to be interpreted in an illustrative and non-limiting sense.

The following aspects are described in sufficient detail to enable those skilled in the art to make and use the disclosure. It is to be understood that other aspects are evident based on the present disclosure, and that system, process, or mechanical changes may be made without departing from the scope of an aspect of the present disclosure.

In the following description, numerous specific details are given to provide a thorough understanding of aspects. However, it will be apparent that aspects may be practiced without these specific details. To avoid obscuring an aspect, some well-known circuits, system configurations, and process steps are not disclosed in detail.

The drawings showing aspects of the system are semi-diagrammatic, and not to scale. Some of the dimensions are for the clarity of presentation and are shown exaggerated in the drawing figures. Similarly, although the views in the drawings are for ease of description and generally show similar orientations, this depiction in the figures is arbitrary for the most part. Generally, the system may be operated in any orientation.

Certain aspects have other steps or elements in addition to or in place of those mentioned. The steps or elements will become apparent to those skilled in the art from a reading of the following detailed description when taken with reference to the accompanying drawings.

What is claimed is:

1. A computer implemented method, comprising:

extracting, by at least one processor, a plurality of identifiers of data from a data source, wherein an identifier uniquely identifies a data sample in the data source, wherein the data source is a not-only Structured Query Language (NoSQL) data source having a flexible schema;

extracting, by the at least one processor, a plurality of data samples from the data source using the plurality of identifiers, wherein each data sample of the plurality of data samples comprises metadata and data;

extracting, by the at least one processor, metadata from each data sample of the plurality of data samples, wherein the metadata comprises schema indicative of a plurality of attributes without a value of each attribute of each respective data sample;

hashing, by the at least one processor, each extracted metadata comprising the schema indicative of the plurality of attributes without the value of each attribute to generate a respective hashed metadata associated with each respective data sample of the plurality of data samples;

comparing, by the at least one processor, the respective hashed metadata with other hashed metadata corresponding to different data samples extracted from the data source to identify one or more unique hashed metadata;

identifying, by the at least one processor, one or more unique schemas corresponding to the one or more unique hashed metadata; and storing, by the at least one processor, the one or more unique schemas in a data store.

2. The method of claim 1, wherein the data samples are extracted in batches from the data source; and wherein a number of batches is a function of a total count of records in the data source and a sampling percentage.

3. The method of claim 1, wherein the data samples are extracted from the data source using a random distribution technique.

4. The method of claim 1, wherein scanning the data comprises:

determining a number of records per dataset based on a total count of records in the data source and a number of datasets;

assigning a start offset value and an end offset value for each dataset; and determining offset values to be extracted for each dataset based on the total count of records in the data source.

5. The method of claim 1, wherein scanning the data comprises:

(a) determining a number of datasets per thread;

(b) retrieving a previous offset value, wherein the previous offset value is indicative of a record of the data source where a previous scan has ended;

(c) determining a number of records per dataset based on the previous offset value and a total count of records in the data source;

(d) assigning a start offset value and an end offset value for each dataset; and (e) generating a random value for each dataset based on the assigned start offset value and end offset value.

6. The method of claim 5, further comprising:

iteratively repeating steps (a) through (e).

7. The method of claim 1, further comprising:

prior to identifying the one or more unique schemas, formatting the extracted metadata.

8. The method of claim 1, further comprising:

outputting the one or more unique schemas to a metadata management and data governance framework, wherein the one or more unique schemas are stored in a standardized format.

9. A system, comprising:

a memory; and at least one processor coupled to the memory and configured to:

extract a plurality of identifiers of data from a data source, wherein an identifier uniquely identifies a data sample in the data source, wherein the data source is a not-only Structured Query Language (NoSQL) data source having a flexible schema;

extract a plurality of data samples from the data source using the plurality of identifiers, wherein each data sample of the plurality of data samples comprises metadata and data;

extract metadata from each data sample of the plurality of data samples, wherein the metadata comprises schema indicative of a plurality of attributes without a value of each attribute of each respective data sample;

hash each metadata comprising the schema indicative of the plurality of attributes without the value of each attribute to generate a respective hashed metadata associated with each respective data sample of the plurality of data samples;

compare the respective hashed metadata with other hashed metadata corresponding to different data samples extracted from the data source to identify one or more unique hashed metadata;

identify one or more unique schemas corresponding to the one or more unique hashed metadata; and store the one or more unique schemas in a data store.

10. The system of claim 9, wherein the data samples are extracted in batches from the data source; and wherein a number of batches is a function of a total count of records in the data source and a sampling percentage.

11. The system of claim 9, wherein the data samples are extracted from the data source using a random distribution technique.

12. The system of claim 9, wherein the at least one processor is further configured to:

determine a number of records per dataset based on a total count of records in the data source and a number of datasets;

assign a start offset value and an end offset value for each dataset; and determine offset values to be extracted for each dataset based on the total count of records in the data source.

13. The system of claim 10, wherein the at least one processor is further configured to:

(a) determine a number of datasets per thread;

(b) retrieve a previous offset value, wherein the previous offset value is indicative of a record of the data source where a previous scan has ended;

(c) determine a number of records per dataset based on the previous offset value and a total count of records in the data source;

(d) assign a start offset value and an end offset value for each dataset; and (e) generate a random value for each dataset based on the assigned start offset value and end offset value.

14. The system of claim 13, wherein the at least one processor is further configured to:

iteratively repeat steps (a) through (e).

15. The system of claim 9, wherein the at least one processor is further configured to:

output the one or more unique schemas to a metadata management and data governance framework, wherein the one or more unique schemas are stored in a standardized format.

16. A non-transitory computer-readable device having instructions stored thereon that, when executed by at least one computing device, cause the at least one computing device to perform operations comprising:

extracting a plurality of identifiers of data from a data source, wherein an identifier uniquely identifies a data sample in the data source, wherein the data source is a not-only Structured Query Language (NoSQL) data source having a flexible schema;

extracting a plurality of data samples from the data source using the plurality of identifiers, wherein each data sample of the plurality of data samples comprises metadata and data;

extracting metadata from each data sample of the plurality of data samples, wherein the metadata comprises schema indicative of a plurality of attributes without a value of each attribute of each respective data sample;

hashing each metadata comprising the schema indicative of the plurality of attributes without the value of each attribute to generate a respective hashed metadata associated with each respective data sample of the plurality of data samples;

comparing the respective hashed metadata with other hashed metadata corresponding to different data samples extracted from the data source to identify one or more unique hash values;

identifying one or more unique schemas corresponding to the one or more unique hashed metadata; and storing the one or more unique schemas in a data store.

17. The non-transitory computer-readable device of claim 16, wherein the data samples are extracted in batches from the data source; and wherein a number of batches is a function of a total count of records in the data source and a sampling percentage.

18. The non-transitory computer-readable device of claim 16, wherein the data samples are extracted from the data source using a random distribution technique.

19. The non-transitory computer-readable device of claim 16, the operations further comprising:

determining a number of records per dataset based on a total count of records in the data source and a number of datasets;

assigning a start offset value and an end offset value for each dataset; and determining offset values to be extracted for each dataset based on the total count of records in the data source.

20. The method of claim 1, wherein the metadata comprises the one or more attributes, and wherein the one or more attributes are hashed and the value of each attribute of the one or more attributes are not hashed.

* * * * *